Dec. 29, 1936.   W. C. LAUGHLIN   2,066,152
FERRIC CHLORIDE FEEDER
Filed July 8, 1935   2 Sheets-Sheet 1
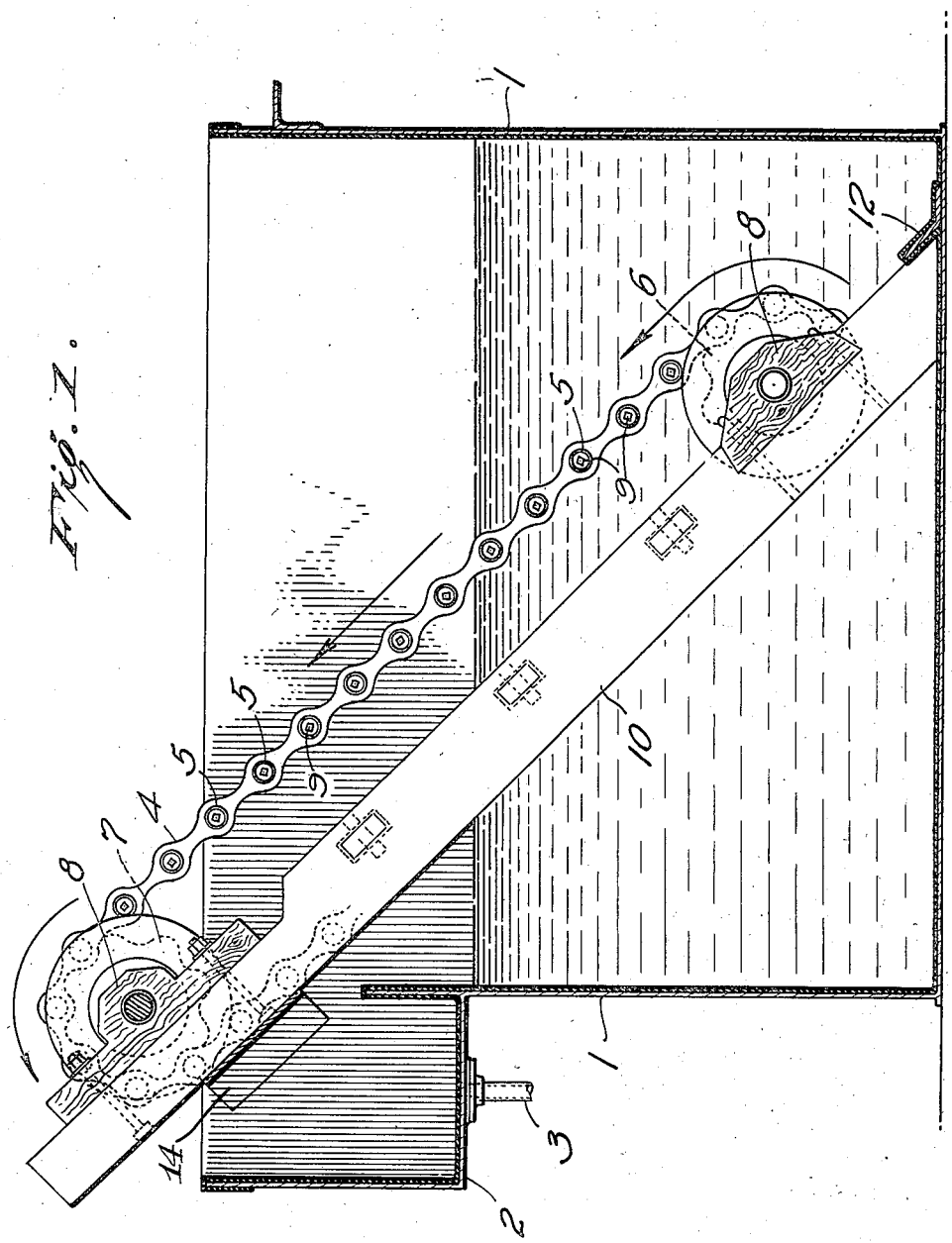
INVENTOR.
WILLIAM C. LAUGHLIN,
BY
ATTORNEY.

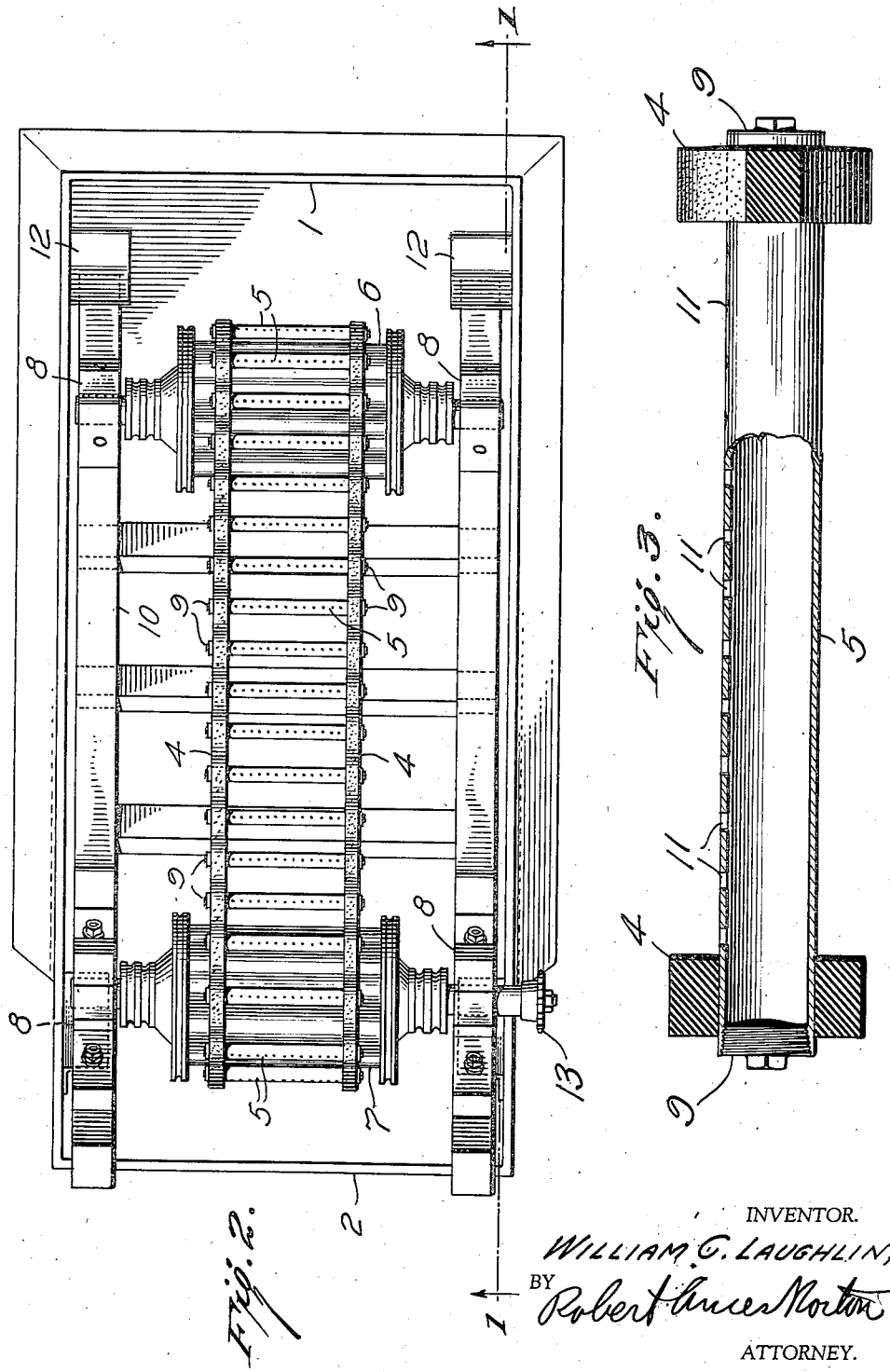

Patented Dec. 29, 1936

2,066,152

UNITED STATES PATENT OFFICE

2,066,152

FERRIC CHLORIDE FEEDER

William C. Laughlin, Bayport, N. Y., assignor to Filtration Equipment Corp., New York, N. Y., a corporation of Delaware Application July 8, 1935, Serial No. 30,314

4 Claims. (Cl. 198—140)

This invention relates to a feeder for chemical solutions and more particularly to feeders for dissolved chemicals such as solutions of ferric salts employed in the treatment of sewage.

In the past, chemical solutions have ordinarily been fed through restricted openings with adjustment by means of cocks and the like. This method, while operating with fair reliability, in the case of liquids which do not tend to form crystals, is awkward in the case of such materials as ferric chloride solutions where crystallization may take place and tend to plug up restricted openings. Moreover, adjustment by means of cocks, unless the flow is fairly large, is usually inaccurate because it is difficult to adjust a cock accurately for very small flows and the operation is entirely dependent on the viscosity of the liquid which may change with temperature and other factors. This difficulty has necessitated the use of elaborate designs of feeders, for example, in ore flotation plants where a very accurate feed of a small amount of flotation reagent is necessary.

According to the present invention, liquids are fed by moving a belt containing a large number of small vessels through a tank of liquid and discharging into a suitable feed launder. The present invention not only permits a completely adjustable feed which will not clog, but also combines agitation of the main body of liquid to prevent settling or clogging. This agitation is effected by entrapping air in the vessels as they dip down into the liquid and suddenly releasing the air preliminary to filling the vessels.

The present invention is suitable for feeding any type of liquid, providing suitable materials are used; in the case of liquids having corrosive or solvent action, a feeder can be made portable, if desirable, or readily removable and a very simple device ensures long life with a minimum of repairs. The invention will be described in detail in conjunction with the feeding of a ferric chloride solution for sewage treatment. It should be understood that the invention is not limited to use with such a solution and that by employing suitable materials of construction, it may be used for feeding any other liquid.

The detailed description will be made in connection with the drawings in which

Fig. 1 is a vertical section through a feeding tank showing the feeding mechanism in elevation;

Fig. 2 is a plan view of the tank and feeding mechanism; and

Fig. 3 is a detail elevation, partly in section of a feeding vessel on an enlarged scale.

Figs. 1 and 2 show a body of liquid contained in a tank 1 along one side of which is a launder 2 with an outflow pipe 3. A pair of supporting beams 10, which for ferric chloride feeding may advantageously be wood, extend into the tank at an angle being retained by suitable stops 12, and support 14. The beams carry wooden bearing blocks 8 in which are journaled the axles of a lower and upper fluted roller 6 and 7. Two narrow corrugated rubber belts 4 are run over the rollers and serve to carry a series of round, hard rubber tubes 5, closed at their ends by plugs 9 and provided with perforations 11. In operation, the rollers 6 and 7 rotate in the direction shown by the arrows in Fig. 1 and may be driven by any suitable source of power, for example, from a sprocket 13 on the axis of the roller 7 (see Fig. 2). As the empty chambers move down through the liquid with their perforations directed downwardly the air is compressed in each chamber by the hydrostatic head of the fluid, until the chamber moves around on the fluted roller 6. When the openings 11 finally are directed upwardly, the compressed air rushes out and is displaced by liquid. This rush of air bubbles serves to agitate the ferric chloride solution and to prevent formation of crystals. After the container tube 5 leaves the liquid, it moves up over the top roller 7 and discharges its liquid into the launder 2.

It will be apparent that the feed is accurately measured and depends only on two factors, the size of the individual vessels 5 and the speed with which they move. Both of these factors are variable. The speed may be varied within fairly wide limits and the capacity of the vessels may be varied by using plugs 9 of different lengths. The vessels are practically non-clogging due to the blowing out which they receive on each passage through the liquid, and an accurately predetermined feed is obtained at all temperatures and practically at all densities as the difference in density of the solution with temperature is a factor which is comparatively insignificant in the ranges of temperature ordinarily encountered.

If repairs or replacements are necessary, they are very easily and simply made as the whole mechanism is readily accessible and can, if desired, be removed bodily from the tank by withdrawing the side beams 10. It will be apparent, of course, that the device may also be made up in portable form and it is an advantage of the present invention that it is extremely flexible and adaptable to many different uses. The small number of moving parts and their rugged construction ensures long life and permits operating with highly corrosive liquids which would rapidly put an intricate mechanism out of order. The fact that the feeder may be of non-metallic construction is a further advantage as it opens up a field of use with liquids which are corrosive to metals but of course where liquids are being handled which do not attack metals, the rollers may be of metal and so may the chambers 5 and even the belts 4.

It is an advantage of the present invention that the accuracy of the feed is in no way dependent on the liquid level in the feed tank, provided the level does not drop below the top of the lower roller. This is an important advantage because in any feeding device involving flow through an orifice, the hydrostatic head is one of the factors and if it varies, so will the feed. Where height is important, the present invention has the added advantage that it permits feeding from a tank which is low and which may even be buried; a desirable advantage in many processes where head room is at a premium.

Another advantage in the present invention lies in the fact that the feeding mechanism is not clogged by periods of inaction and does not require a readjustment of cocks. Thus, for example, where there are several feeding tanks with a common launder, solution may be fed from one tank and then shifted over to the other tank without any adjustments which would be necessary in the ordinary feeding mechanisms.

I claim:

1. A feeding mechanism for liquids comprising a feeding tank containing liquids, a discharge launder adjacent to the tank, an endless chain of substantially closed feeding vessels in said tank and extending over the launder, said vessels being provided only with small openings on one side only so that in moving downwardly into the liquid, air in the vessels is compressed and released in the form of jets when the endless chain reverses direction in the liquid.

2. A feeding mechanism comprising in combination a tank with liquid therein, a discharge launder adjacent thereto, a framework containing upper and lower rollers extending into the liquid and over the launder, a plurality of endless belts running over the rollers and carrying between them horizontal chambers provided with perforations on one side so adjusted as to be directed downwardly when the belt runs down through the liquid and upwardly when on the return run, said perforations being sufficiently small to result in compressing air into the chambers during the downward movement of the belt through the liquid.

3. A device according to claim 2 in which the chambers are hollow cylinders plugged at at least one end.

4. A device according to claim 2 in which the belts are corrugated rubber belts carrying rubber cylinders plugged at at least one end.

WILLIAM C. LAUGHLIN.